United States Patent
Sorkin et al.

(10) Patent No.: US 12,334,840 B2
(45) Date of Patent: Jun. 17, 2025

(54) VARIABLE SPEED CONSTANT FREQUENCY (VSCF) VOLTAGE REGULATION CIRCUIT FOR AN AIRCRAFT

(71) Applicant: SAFRAN POWER USA, LLC, Twinsburg, OH (US)

(72) Inventors: Lev Sorkin, Twinsburg, OH (US); Sergey Mischuk, Twinsburg, OH (US); Boaz De-Medonsa, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 344 days.

(21) Appl. No.: 17/922,904

(22) PCT Filed: May 5, 2020

(86) PCT No.: PCT/US2020/031408
§ 371 (c)(1),
(2) Date: Nov. 2, 2022

(87) PCT Pub. No.: WO2021/225580
PCT Pub. Date: Nov. 11, 2021

(65) Prior Publication Data
US 2023/0163698 A1 May 25, 2023

(51) Int. Cl.
*H02M 7/538* (2007.01)
*H02M 1/00* (2006.01)
(Continued)

(52) U.S. Cl.
CPC ..... *H02M 7/53871* (2013.01); *H02M 1/0025* (2021.05); *H02M 7/5395* (2013.01)

(58) Field of Classification Search
CPC ...... H02M 7/483; H02M 7/487; H02M 7/493; H02M 7/53871; H02M 7/5395;
(Continued)

(56) References Cited

U.S. PATENT DOCUMENTS 10,370,960 B2 * 8/2019 Orban ................ E21B 47/00
2023/0275521 A1 * 8/2023 Song ................ H02M 7/217
363/21.14

FOREIGN PATENT DOCUMENTS

CN 107231096 A * 10/2017 .......... H02M 7/2176
CN 107231096 B * 3/2023 .......... H02M 7/2176
(Continued)

OTHER PUBLICATIONS

International Search Report and Written Opinion, International Application No. PCT/US2020/031408 dated Feb. 26, 2021, 13 pages.
(Continued)

Primary Examiner — Kyle J Moody
(74) Attorney, Agent, or Firm — Kilpatrick Townsend & Stockton LLP

(57) ABSTRACT

A variable speed constant frequency electric voltage regulation circuit may include a slow voltage loop detecting and adjust an amplitude of an output signal of the circuit. A fast voltage loop of the circuit may include an error amplifier detecting a difference between a reference sine wave signal and the output signal. A current control loop may include a current controller and an inverter. A first switch may toggle a gain of the circuit between a gain associated with a normal mode and a gain associated with a power transfer mode based on a power transfer command signal. A second switch may toggle control between the current control loop in the power transfer mode and the fast and slow voltage loops in the normal mode. The sample/hold circuit eliminates the slow voltage loop from regulating the output during the power transfer.

20 Claims, 4 Drawing Sheets

(51) Int. Cl.
*H02M 7/5387* (2007.01)
*H02M 7/5395* (2006.01)

(58) Field of Classification Search
CPC ... H02M 2001/0025; H02M 2001/009; H02M 2001/123
See application file for complete search history.

(56) References Cited

FOREIGN PATENT DOCUMENTS

| WO | WO-2020068090 A1 * | 4/2020 | .......... | H02M 1/0012 |
| WO | WO-2023163876 A1 * | 8/2023 | .......... | H02M 1/4208 |

OTHER PUBLICATIONS

International Application No. PCT/US2020/031408, International Preliminary Report on Patentability mailed on Nov. 17, 2022, 10 pages.

\* cited by examiner

VARIABLE SPEED CONSTANT FREQUENCY (VSCF) VOLTAGE REGULATION CIRCUIT FOR AN AIRCRAFT

BACKGROUND

Circulating current between two systems which are to be operated in parallel may be challenging. For example, a small phase difference between the voltages or differences in amplitudes of the two systems may result in large currents, which may be undesirable. Additionally, for an inverter type of system there may be a DC component, which may also be undesirable. Historically, analytical digital converters and digital algorithms were applied to address the DC component.

BRIEF DESCRIPTION

According to one aspect, a circuit may include a slow voltage loop, a fast voltage loop, a current control loop, a first switch, and a second switch. The slow voltage loop may include a rectifier and a sample and hold circuit. The slow voltage loop may be configured to detect and adjust an amplitude of an output signal of the circuit. The fast voltage loop may include an error amplifier configured to detect a difference between a reference sine wave signal and the output signal. The current control loop may include a current controller and an inverter. The current controller receives current feedback from an output of the inverter, a sawtooth reference signal, and a current controller reference signal from the fast voltage loop. The first switch and the second switch may be connected to the fast voltage loop. The first switch may be configured to toggle a gain of the circuit between a gain associated with a normal mode and a gain associated with a power transfer mode based on a power transfer command signal. The second switch may be configured to toggle control between the current control loop in the power transfer mode and the fast and slow voltage loops in the normal mode.

The slow voltage loop may include an amplifier comparing an output of the rectifier with a reference signal. The sample and hold circuit may be controlled by a power transfer command signal. The circuit may include a first multiplier, a second multiplier, and a third multiplier, the first multiplier may receive the output signal of the circuit, the second multiplier may receive the reference sine wave signal, and the third multiplier may receive an output of the error amplifier and generate the current controller reference signal. The circuit may include a DC content compensation circuit configured to have different gains associated with AC content and DC content for voltage associated with the DC content compensation circuit. The DC content compensation circuit may include a feedback portion including a first diode and a second diode in a back to back configuration. The DC content compensation circuit may include a feedback portion including a resistor in parallel with a capacitor, in series with a second resistor.

For the first switch, the gain associated with the normal mode may be equal to one and the gain associated with the power transfer mode may be equal to a fraction of one. For the first switch, the gain associated with the power transfer mode may be determined based on characteristics of a second electrical system associated with power transfer. For the second switch, the gain associated with the normal mode may be equal to one and the gain associated with the power transfer mode may be equal to one half.

According to one aspect, a circuit may include a slow voltage loop, a fast voltage loop, a current control loop, a first switch, a second switch, and a DC content compensation circuit. The DC content compensation circuit may be configured to have different gains associated with AC content and DC content for voltage associated with the DC content compensation circuit. The slow voltage loop may include a rectifier and a sample and hold circuit. The slow voltage loop may be configured to detect and adjust an amplitude of an output signal of the circuit. The fast voltage loop may include an error amplifier configured to detect a difference between a reference sine wave signal and the output signal. The current control loop may include a current controller and an inverter. The current controller may receive feedback from an output of the inverter, a sawtooth reference signal, and a current controller reference signal from the fast voltage loop. The first switch and the second switch may be connected to the fast voltage loop. The first switch may be configured to toggle a gain of the circuit between a gain associated with a normal mode and a gain associated with a power transfer mode based on a power transfer command signal. The second switch may be configured to toggle control between the current control loop in the power transfer mode and the fast and slow voltage loops in the normal mode.

The slow voltage loop may include an amplifier comparing an output of the rectifier with a reference signal. The sample and hold circuit may be controlled by a power transfer command signal. The circuit may include a first multiplier, a second multiplier, and a third multiplier, the first multiplier may receive the output signal of the circuit, the second multiplier may receive the reference sine wave signal, and the third multiplier may receive an output of the error amplifier and generate the current controller reference signal. The DC content compensation circuit may include a feedback portion including a first diode and a second diode in a back to back configuration. The DC content compensation circuit may include a feedback portion including a resistor in parallel with a capacitor, in series with a second resistor. For the first switch, the gain associated with the normal mode may be equal to one and the gain associated with the power transfer mode may be equal to a fraction of one. For the first switch, the gain associated with the power transfer mode may be determined based on characteristics of a second electrical system associated with power transfer. For the second switch, the gain associated with the normal mode may be equal to one and the gain associated with the power transfer mode may be equal to one half.

According to one aspect, a circuit may include a slow voltage loop, a fast voltage loop, a current control loop, a first switch, a second switch, and a DC content compensation circuit. The DC content compensation circuit may be configured to have different gains associated with AC content and DC content for voltage associated with the DC content compensation circuit and may include a feedback portion may include a first diode and a second diode in a back to back configuration, a first resistor in parallel with a capacitor, in series with a second resistor. The slow voltage loop may include a rectifier and a sample and hold circuit. The slow voltage loop may be configured to detect and adjust an amplitude of an output signal of the circuit. The fast voltage loop may include an error amplifier configured to detect a difference between a reference sine wave signal and the output signal. The current control loop may include a current controller and an inverter. The current controller may receive feedback from an output of the inverter, a sawtooth reference signal, and a current controller reference signal from the fast voltage loop. The first switch and the second switch may be connected to the fast voltage loop. The first switch may be configured to toggle a gain of the circuit between a gain associated with a normal mode and a gain associated with a power transfer mode based on a power transfer command signal. The second switch may be configured to toggle control between the current control loop in the power transfer mode and the fast and slow voltage loops in the normal mode.

DETAILED DESCRIPTION

Figure 1:
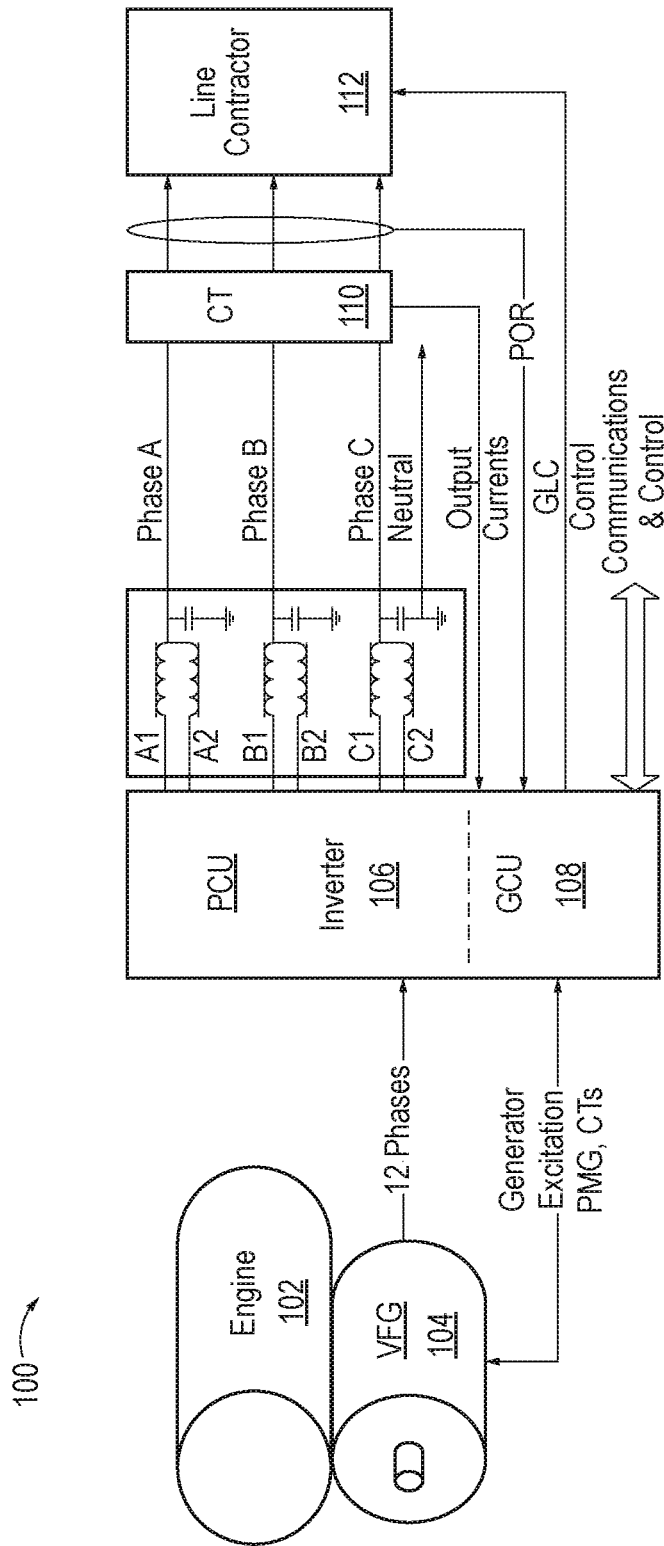
FIG. 1 is an exemplary component diagram of a variable speed constant frequency (VSCF) voltage regulator, according to one aspect.

FIG. 1 is an exemplary component diagram of a variable speed constant frequency (VSCF) voltage regulator 100, according to one aspect. In FIG. 1, there is an engine 102 coupled to a variable frequency generator (VFG) 104, which has 12 phases and connected to a power conversion unit (PCU) 106 in communication with a generator control unit (GCU) 108. The PCU may receive the 12 phases of input power, which are rectified are sent to an inverter. One 6 phase group is used to produce the positive DC-Link voltage and another 6 phase group is used to produce the negative DC-Link voltage. Both DC-Link buses (i.e., positive and negative) have the main ripple component which is thrice the output fundamental frequency (i.e., 1200 Hz for a 400 Hz output). Since the change in power consumption from the positive and negative DC-Link voltages are the cause for the ripple, an ability to keep the instantaneous sum of the powers taken from both DC-Links as constant as possible, will result in a better balanced generator.

For example, the inverter may have +/−185 volts going through it. According to one aspect, two 3-phase inverters may be implemented, using neutral point clamp architecture and each phase may have four transistors allocated to them. The outputs of the two 3-phase inverters may be paralleled and interleaved by an interleaving controller controlling the respective phases. For example, the interleaving controller may interleave a first phase A1 with a second phase A2 and shift a pulse width modulation (PWM) by 180 degrees before merging together at the inverter output and providing the power through a current transformer (CT) 110 to line contactor 112. The POR in FIG. 1 may be a point of regulation (POR).

Figure 2:
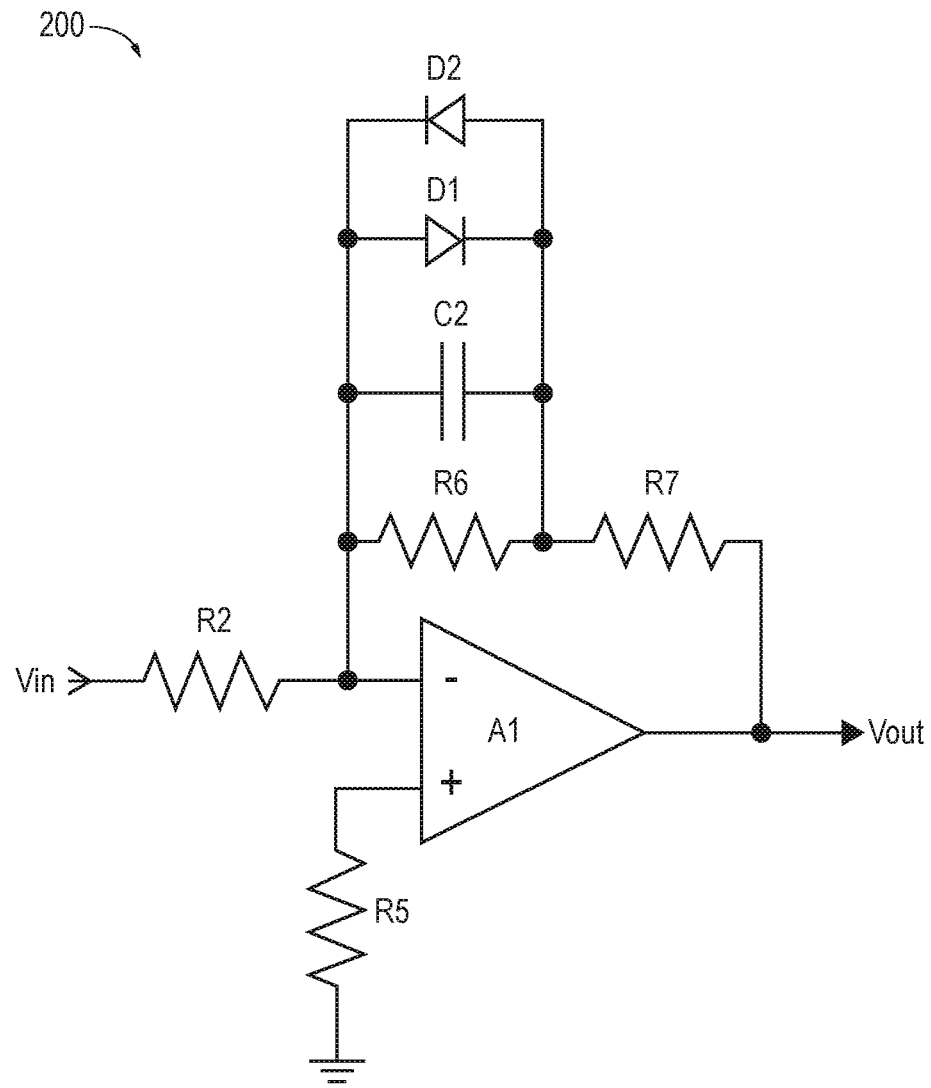
FIG. 2 is an exemplary circuit diagram of a DC content compensation circuit for the variable speed constant frequency (VSCF) voltage regulator of FIG. 1, according to one aspect.

FIG. 2 is an exemplary circuit diagram of a DC content compensation circuit 200 for the variable speed constant frequency (VSCF) voltage regulator of FIG. 1, according to one aspect. FIG. 2 is an exemplary circuit diagram of circuitry 200 in the signal conditioning network to detect and amplify the DC content in the network. This ability to measure the zero sequence voltage allows the voltage regulator to reduce the DC content by controlling the positive sequence voltage. According to one aspect, R6, R7 are located in a feedback portion of the DC content compensation circuit 200 while R2 is located at the input portion of the DC content compensation circuit 200. When DC content is detected, the error is integrated and applied to POR voltage regulator which takes corrective action to reduce the zero sequence component of the voltage.

The circuit of FIG. 2 has different gains for the AC and DC components of the POR voltage or voltage associated with the DC content compensation circuit. The gains for AC and DC content are determined by the differential amplifier A1 feedback components. The gain for the AC content is defined by R2, R7, R6 and C2 connected to the inverting amplifier input, while the DC component gain is governed by R2, R6 and R7 values. If the C2 value is selected to present a very low impedance at operating frequency (60 Hz or 400 Hz, for instance) then simplified gain equations will be:

$AC\ Gain = R7/R2$, for $1/(2\pi F*C2) << R6$; and $DC\ Gain = (R7+R6)/R2$

Therefore, the DC Gain is higher than the AC gain (R6+R7)/R7 times. The amplified DC component then has a higher compensatory effect on the regulation loop (FIG. 4, fast voltage loop), thus actively reducing the converter output voltage DC component.

Two back-to-back diodes D1, D2 limit the voltage across C2, preventing the amplifier A1 from saturating when the Vin DC component voltage level is high. These diodes limit the DC compensation dynamic range, but are effective during the load transients that can induce a relatively large DC level into the converter.

As depicted in FIG. 2, R2 is connected to the inverting amplifier input (i.e., negative) and R5 is connected to the other amplifier input. R6 and C2 are in a parallel configuration with one another and in series with R7 at the feedback portion of the DC content compensation circuit 200. Because diodes D1, D2 are connected in a back to back configuration, one diode may be forward biased during one cycle of the supply, while the other diode is reversed biased and current does not flow. In this way, the back-to-back diodes D1, D2 limit the voltage across C2, preventing the amplifier A1 from saturating when the Vin DC component voltage level is high, and thereby reducing the DC component overall.

Figure 3:
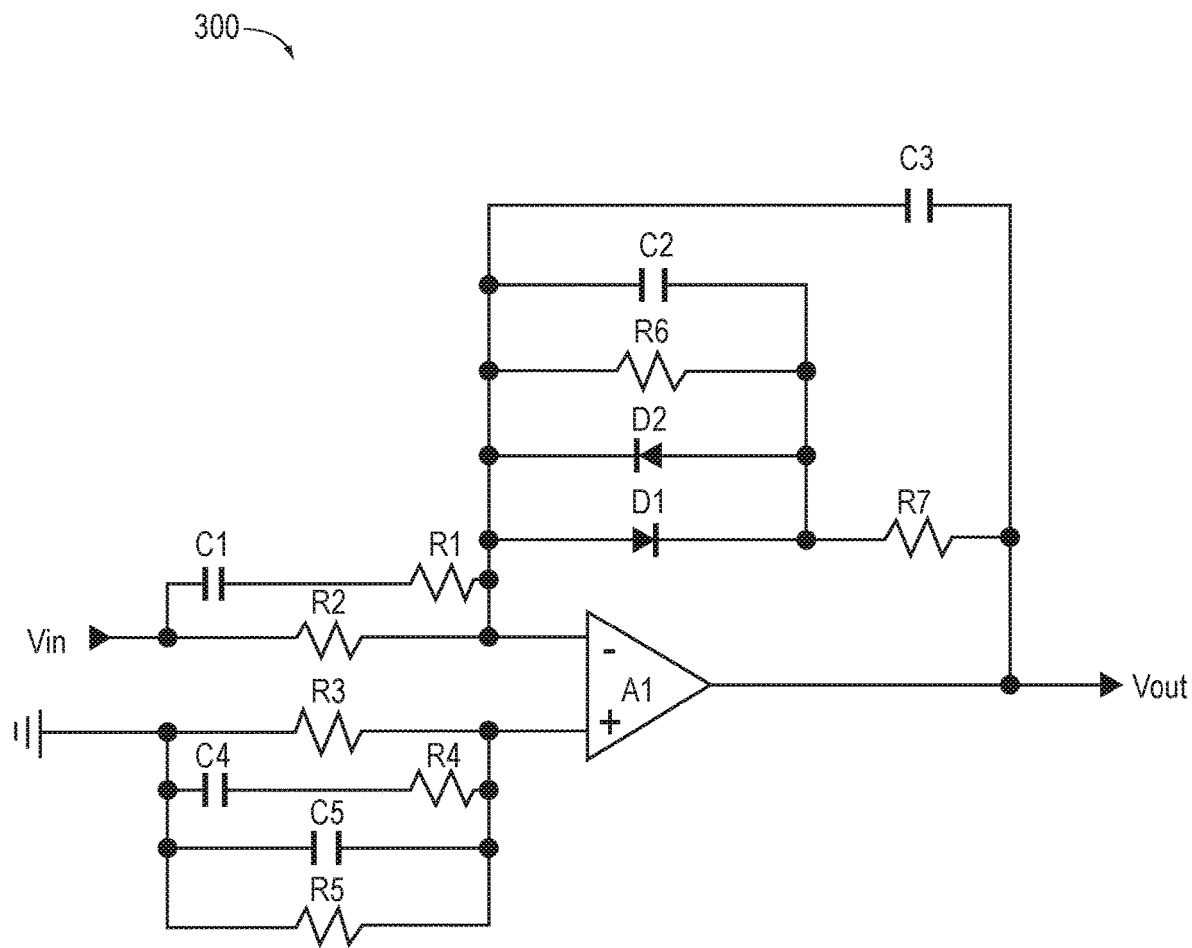
FIG. 3 is an exemplary circuit diagram of a DC content compensation circuit for the variable speed constant frequency (VSCF) voltage regulator of FIG. 1, according to one aspect.

FIG. 3 is an exemplary circuit diagram of a DC content compensation circuit 300 for the variable speed constant frequency (VSCF) voltage regulator of FIG. 1, according to one aspect. The DC content compensation circuits of FIGS. 2-3 may facilitate DC content compensation or DC content reduction. FIG. 3 depicts one implementation that includes additional compensation circuitry (i.e., C1, R1, C3, C4, R4, C5, R5). According to one aspect, R2 and C3 may be a part of an integrator within the DC content compensation circuit 300 of FIG. 3. In this way, a simple integrator may be implemented within the POR feedback circuitry to amplify the DC content forcing the voltage regulator to correct an error detected.

In any event, the DC content compensation circuits of FIGS. 2-3 detect DC voltage, amplify the detected DC voltage more than an actual AC voltage, and deliver this into the feedback loop. For example, if a positive DC is detected, from the output, the error amplifier A1 of the DC content compensation circuits of FIGS. 2-3 may generate a corresponding negative compensation to compensate the DC component to zero.

In FIG. 3, C1 in series with R1 and in parallel with R2 is connected to the inverting amplifier input. R3 in parallel with C4 and R4, C5, and R5 is connected to the other amplifier input. C3 in parallel with R7 in series with C2 in parallel with R6 and the back-to-back diode D1, D2 configuration is the feedback portion of the DC content compensation circuit 300 of FIG. 3. Thus, the DC content compensation circuit 300 may include a feedback portion including the first diode D1 and the second diode D2 in a back to back configuration. Additionally, the feedback portion may include a resistor (R6) in parallel with a capacitor (C2), in series with a second resistor (R7).

Figure 4:
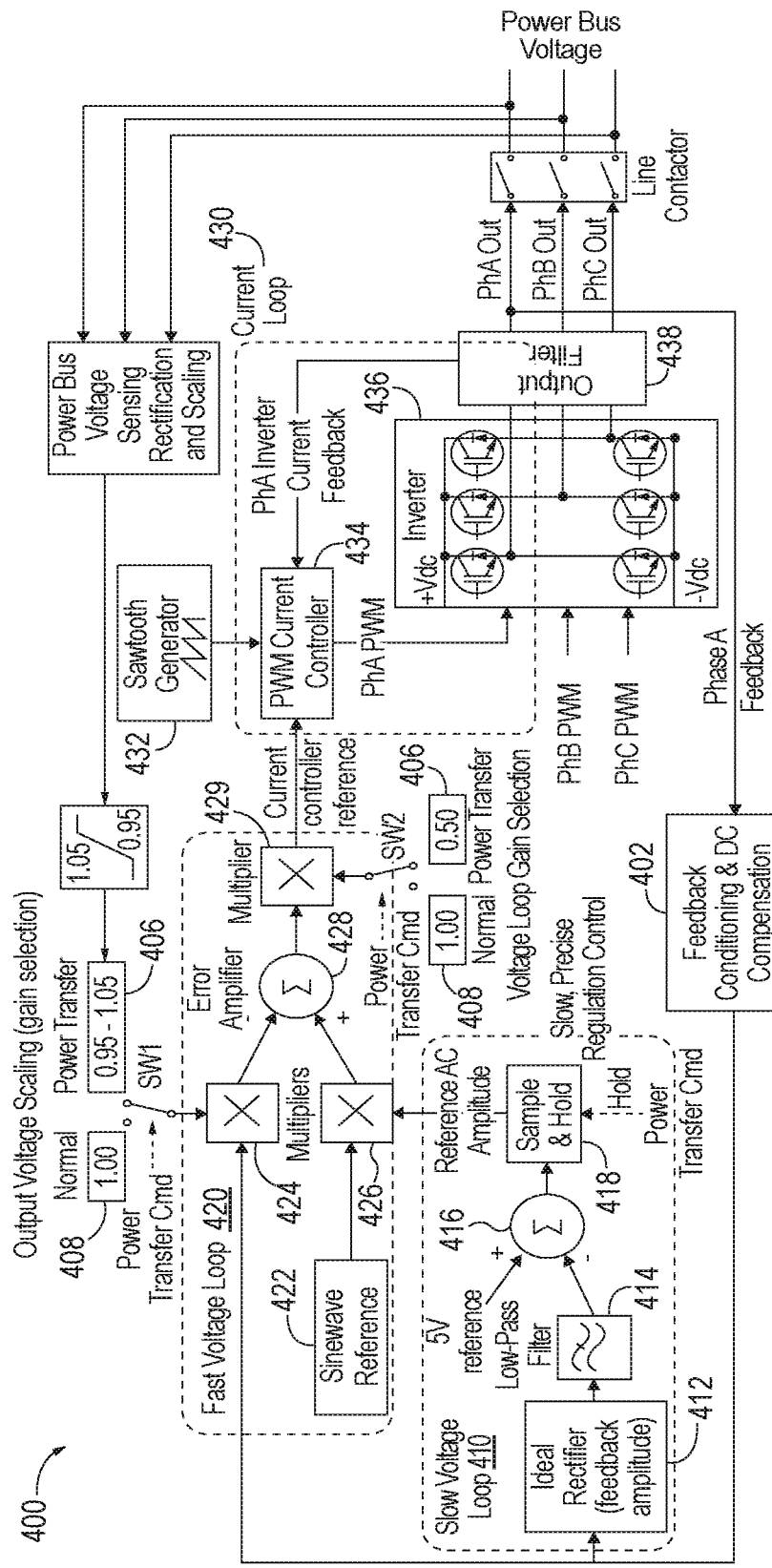
FIG. 4 is an exemplary circuit diagram of an impedance softening circuit for the variable speed constant frequency (VSCF) voltage regulator of FIG. 1, according to one aspect.

FIG. 4 is an exemplary circuit diagram of an impedance softening circuit 400 for the variable speed constant frequency (VSCF) voltage regulator of FIG. 1, according to one aspect. The impedance softening circuit 400 may include an inverter control loop, which may include multiple control loops used to control the systems associated with a power transfer which may be a no break power transfer. As used herein, a 'loop' may refer to or include a circuit.

Impedance softening may include a process, steps, or acts in which the gain of the voltage regulator is diminished and a current control loop is allowed to dominate, reducing the stiffness of the source, and effectively increasing the output impedance of the system. In this way, impedance softening may reduce the circulating current between the two parallel sources during the process of synchronization for a power transfer and facilitate a no break power transfer.

The impedance softening circuit 400 may include a feedback conditioning and DC compensation circuit 402. According to one aspect, either the DC content compensation circuit 200 of FIG. 2 or the DC content compensation circuit 300 of FIG. 3 may be included within the feedback conditioning & DC compensation module of FIG. 4.

The impedance softening circuit 400 may include multiple loops, such as a slow voltage loop 410, a fast voltage loop 420, and a current control loop 430. The slow voltage loop 410 may include an ideal rectifier 412, a low pass filter 414, an amplifier 416, and a sample and hold circuit 418 which may be driven by a power transfer command. The power transfer command may be a signal which is provided in advance of a power transfer between two electrical systems. As will be discussed herein, the power transfer command may be used to operate a first switch SW1 and a second switch SW2 as well. The slow voltage loop 410 may include an amplifier 416 comparing an output of the rectifier 412 with a reference signal.

In any event, the ideal rectifier 412 may receive an output from the DC compensation circuit 402 and produce an output which is passed through the low pass filter 414. The output of this low pass filter 414 may be compared against a reference signal, such as a 5V reference signal. The sample and hold circuit 418 may use the output of the amplifier 416 as the voltage to be sampled (or held). As previously discussed, when the power transfer command signal indicates a power transfer, this voltage will be held at its last value. The sample and hold circuit may be controlled by the power transfer command signal.

The ideal rectifier circuit 412 and the slow voltage loop 410 may be configured to detect and adjust an amplitude of the output signal from the DC content compensation circuit 402 or an output signal of the circuit 400. The slow voltage loop 410 adjusts the output voltage and/or amplitude of the output signal from the DC content compensation circuit 402 in a slow, accurate manner, and generally operates within a time frame of 100-200 milliseconds. In the normal mode 408 (i.e., when the SW1 and SW2 are switched to 'normal'), the slow voltage loop 410 output goes to the sample and hold circuit 418, where the output may be continuously updated. The sample and hold circuit 418 may be an analog device or circuit that samples the voltage of a continuously varying analog signal (i.e., from the phase A feedback and/or the output of the DC compensation circuit 402) and holds, locks, or freezes its value at a constant level for a specified minimum period of time.

The fast voltage loop 420 may include a sinewave reference generator 422, a first multiplier 424, a second multiplier 426, an error amplifier 428, and a third multiplier 429. The fast voltage loop 420 may be controlled by the SW1, which may toggle between a first operating mode and a second operating mode. The first operating mode may be a normal mode 408 and the second operating mode may be a power transfer mode 406. The first multiplier 424 may receive the output from the DC compensation circuit 402 or the output signal of the circuit 400. The second multiplier 426 may receive the sinewave reference signal from the sinewave reference signal generator 422 and a reference AC amplitude from the sample and hold circuit 418. The outputs of respective multipliers 424, 426 may be fed to the error amplifier 428, which feeds its output to the third multiplier 429. The third multiplier may receive an output of the error amplifier 428 and generate the current controller reference signal to drive the current controller.

According to one aspect, SW1 and SW2 may be driven by the power transfer command, which may control the opening and closing of SW1 and SW2. In this way, the two switches SW1 and SW2 may be flipped during a parallel operation, power transfer operation, which may change a gain of a control loop and change a scale for the input voltage. The first switch SW1 and the second switch SW2 may be connected to the fast voltage loop 420.

For example, SW1, when flipped or switched, may change the gain or the voltage scaling of the inverter control loop. The first switch, SW1, may be configured to toggle a gain of the circuit between a gain associated with a normal mode and a gain associated with a power transfer mode based on a power transfer command signal. SW2, when flipped or switched, may change an output voltage level. The second switch, SW2, may be configured to toggle gain ratios between the current control loop and the fast voltage loop in the power transfer modes by reducing the fast voltage control gain compared to the normal mode. Effectively, the larger circulating currents may move the voltage, instant voltage volume and the way to reduce them. When SW1 and SW2 are switched to the power transfer mode, the slow voltage loop applies the hold state, thereby excluding the slow voltage loop from controlling the voltage.

In a scenario when the no break power transfer is to be implemented and circulating reduction desired, SW1 and SW2 are turned in opposite positions. The sample and hold from the slow control loop 410 holds the voltage so that no sampling occurs. When SW1 is switched to the power transfer side (i.e., 0.95-1.05), the gain becomes 0.95, which means the output voltage, if nothing else changes, will go up, thereby upregulating by 5%. In this way, SW1, when switched to the power transfer mode, enables upregulating by the fast voltage loop 420.

According to one aspect, for the first switch, the gain associated with the normal mode 408 is equal to one and the gain associated with the power transfer mode is equal to a fraction of one (e.g., 0.95).

Explained another way, SW1 modifies the feedback voltage gain. Reduction in the gain (e.g., from 1.0 to 0.95) may result in 5% up-regulation (i.e., output voltage increase), while the gain increase, would reduce the output voltage. This feature may be utilized to adjust the output voltage to better match the other (i.e., second) source output. The more closely the voltages are matched, less current will circulate between two electrical systems involved in a power transfer. According to one aspect, the gain selection happens prior to the synchronization. In other words, gain selection may be based on the measurement of the "other" generator output voltage. If the "other" voltage is outside the nominal range, no break power transfer (NBPT) will not happen and the system would default to a break power transfer operation. Another reason for the "upregulation" is the voltage drop due to the load that happens when the system output impedance is increased to minimize the circulating currents.

In other words, the upregulating may be implemented because the output voltage and the other source voltage of the second system may be unknown. If the voltage of the first system is lower than the voltage of the second system, there is a change that impedance softening compensation may not be sufficient. In this regard, upregulating enables the voltage of the first system to be larger than the voltage associated with the second system, thereby providing protection from an influx of current from the second system.

Additionally, if there is a load on the power bus, because the voltage loop may have 50% authority based on SW2 switching from 1.00 to 0.50 from the gain selection, the voltage of the first system may dip with the current. Upregulating may compensate the voltage slightly from that dip in the output. For example, for the second switch, the gain associated with the normal mode may be equal to one and the gain associated with the power transfer mode is equal to one half.

As seen in FIG. 4, SW2 is switched to the power transfer operation and sets the weight of the voltage control loop from 1 to 0.50. It will be appreciated that the power transfer settings associated with SW1 and SW2 may be set to other numbers and that the 0.95 and 0.50 settings are merely exemplary. According to one aspect, for the first switch, the gain associated with the power transfer mode may be determined based on characteristics of a second electrical system associated with power transfer. In any event, when the switches SW1 and SW2 are switched to the power transfer operation mode or state (which is the mode depicted in FIG. 4), the amplifier 416 of the slow voltage loop 410 no longer controls the amplitude of the signal because the output of the summation amplifier 416 from the slow voltage loop 410 is locked, effectively locking the slow voltage loop 410 or turning the slow voltage loop 410 off. SW2 effectively changes the authority or the balance between the current control loop 430 and the voltage control loops 410, 420. When a larger authority is given to the current control loop 430, the current may be minimized.

Again, SW2 scales down the voltage loop (e.g., 410, 420) regulation authority by reducing the voltage loop gain. The error amplified output creates a reference voltage for the current loop. The lower this reference, the higher amount of authority the current loop has. This means that the circulating currents will be automatically reduced (at the expense of voltage accuracy), effectively increasing the converter dynamic output impedance. Application of a power transfer command to the slow, precise voltage regulation loop 410 disables this control loop, thereby preventing the slow voltage loop 410 from adjusting the output voltage.

The current control loop 430 may include a current controller 434 coupled to a sawtooth waveform generator 432 and an inverter 436 connected to an output filter 438.

In FIG. 4, the inverter control loop may be associated with a 3-phase output (i.e., PhA Out, PhB Out, PhC Out). Each one of the phase outputs of the 3-phase output may be fed to the DC content compensation circuit and the power bus voltage sensing rectification and scaling circuit. The output from the DC content compensation circuit 402 may be fed to the ideal rectifier circuit of the slow voltage loop 410 and the multiplier of the fast voltage loop 420.

The fast voltage loop 420 associated with the multipliers operates where in the normal mode 408, the gain is equal to one. The output signal from the DC content compensation circuit 402 is passed through the first multiplier 424. The output from the slow voltage loop 410 and the sine wave reference 422 may be passed through the second multiplier 426. In this way, the slow voltage loop 410 may scale the sine wave reference 422. The outputs of both multipliers 424, 426 may be fed to the error amplifier 428 and the output of the error amplifier 428 fed through the third multiplier 429. Thus, the fast voltage loop 420 may be configured to detect a difference between the phase output or output signal of the circuit 400 and the reference sine wave 422.

If the voltage dips, the sine wave reference will be up. If the voltage dips or lowers more than desired due to the current slow, the reference AC amplitude may make the voltage go up again and the sine way reference will be multiplied by some gain, and comparing with a larger signal, results in controlling the voltage to increase. As discussed, the output of the error amplifier 428 is fed to the third multiplier 429, thereby generating a feedback signal (e.g., a 'soft' feedback signal), which may be sent as a reference to the current controller 434.

The current controller may be a pulse-width modulation (PWM) current controller, which may have the sawtooth generator 432 on one side, instant current feedback on the other side (i.e., PhA inverter 436 current feedback from the output filter). The current control loop 430 may blend the sawtooth signal 432 with current feedback from the output filter 438 with the current controller signal from the third multiplier 429. The current controller may receive feedback from an output of the inverter, the sawtooth reference signal, and the current controller reference signal from the fast voltage loop 420. In this way, the fast voltage loop 420 may provide the current control loop 430 with the voltage controlled reference signal. The impedance softening circuit 400 of FIG. 4 may produce impedance softening effects to facilitate reduction of circulating currents between two systems associated with power transfer.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A variable speed constant frequency electric voltage regulation circuit for use in an aircraft, the circuit comprising:
a slow voltage loop including a rectifier and a sample and hold circuit, the slow voltage loop configured to detect an amplitude of an output signal of the circuit and adjust the amplitude of the output signal of the circuit;

a fast voltage loop including an error amplifier configured to detect a difference between a reference sine wave signal and the output signal;

a current control loop including a current controller and an inverter, wherein the current controller receives a feedback from an output of the inverter, a sawtooth reference signal, and a current controller reference signal from the fast voltage loop;

a first switch; and a second switch, wherein the first switch and the second switch are connected to the fast voltage loop, wherein the first switch is configured to toggle a gain of the circuit between a gain associated with a normal mode and a gain associated with a power transfer mode based on a power transfer command signal, and wherein the second switch is configured to toggle control between the current control loop in the power transfer mode and the fast and slow voltage loops in the normal mode.

2. The circuit of claim 1, wherein the slow voltage loop includes an amplifier comparing an output of the rectifier with a reference signal.

3. The circuit of claim 1, wherein the sample and hold circuit is controlled by the power transfer command signal.

4. The circuit of claim 1, comprising a first multiplier, a second multiplier, and a third multiplier, wherein the first multiplier receives the output signal of the circuit, the second multiplier receives the reference sine wave signal, and the third multiplier receives an output of the error amplifier and generates the current controller reference signal.

5. The circuit of claim 1, comprising a DC content compensation circuit configured to have different gains associated with an AC content and a DC content for voltage associated with the DC content compensation circuit.

6. The circuit of claim 5, wherein the DC content compensation circuit includes a feedback portion including a first diode and a second diode in a back to back configuration.

7. The circuit of claim 5, wherein the DC content compensation circuit includes a feedback portion including a resistor in parallel with a capacitor, in series with a second resistor.

8. The circuit of claim 1, wherein, for the first switch, the gain associated with the normal mode is equal to one and the gain associated with the power transfer mode is equal to a fraction of one.

9. The circuit of claim 1, wherein, for the first switch, the gain associated with the power transfer mode is determined based on characteristics of a second electrical system associated with the power transfer mode.

10. The circuit of claim 1, wherein, for the second switch, the gain associated with the normal mode is equal to one and the gain associated with the power transfer mode is equal to one half.

11. A variable speed constant frequency electric voltage regulation circuit for use in an aircraft, the circuit comprising:

a slow voltage loop including a rectifier and a sample and hold circuit, the slow voltage loop configured to detect an amplitude of an output signal of the circuit and adjust the amplitude of the output signal of the circuit;

a fast voltage loop including an error amplifier configured to detect a difference between a reference sine wave signal and the output signal;

a current control loop including a current controller and an inverter, wherein the current controller receives a feedback from an output of the inverter, a sawtooth reference signal, and a current controller reference signal from the fast voltage loop;

a first switch;

a second switch; and a DC content compensation circuit configured to have different gains associated with an AC content and a DC content for voltage associated with the DC content compensation circuit, wherein the first switch and the second switch are connected to the fast voltage loop, wherein the first switch is configured to toggle a gain of the circuit between a gain associated with a normal mode and a gain associated with a power transfer mode based on a power transfer command signal, and wherein the second switch is configured to toggle control between the current control loop in the power transfer mode and the fast and slow voltage loops in the normal mode.

12. The circuit of claim 11, wherein the slow voltage loop includes an amplifier comparing an output of the rectifier with a reference signal.

13. The circuit of claim 11, wherein the sample and hold circuit is controlled by the power transfer command signal.

14. The circuit of claim 11, comprising a first multiplier, a second multiplier, and a third multiplier, wherein the first multiplier receives the output signal of the circuit, the second multiplier receives the reference sine wave signal, and the third multiplier receives an output of the error amplifier and generates the current controller reference signal.

15. The circuit of claim 11, wherein the DC content compensation circuit includes a feedback portion including a first diode and a second diode in a back to back configuration.

16. The circuit of claim 11, wherein the DC content compensation circuit includes a feedback portion including a resistor in parallel with a capacitor, in series with a second resistor.

17. The circuit of claim 11, wherein, for the first switch, the gain associated with the normal mode is equal to one and the gain associated with the power transfer mode is equal to a fraction of one.

18. The circuit of claim 11, wherein, for the first switch, the gain associated with the power transfer mode is determined based on characteristics of a second electrical system associated with the power transfer mode.

19. The circuit of claim 11, wherein, for the second switch, the gain associated with the normal mode is equal to one and the gain associated with the power transfer mode is equal to one half.

20. A variable speed constant frequency electric voltage regulation circuit for use in an aircraft, the circuit comprising:

a slow voltage loop including a rectifier and a sample and hold circuit, the slow voltage loop configured to detect an amplitude of an output signal of the circuit and adjust the amplitude of the output signal of the circuit;

a fast voltage loop including an error amplifier configured to detect a difference between a reference sine wave signal and the output signal;

a current control loop including a current controller and an inverter, wherein the current controller receives a feedback from an output of the inverter, a sawtooth reference signal, and a current controller reference signal from the fast voltage loop;

a first switch;

a second switch; and a DC content compensation circuit configured to have different gains associated with an AC content and a DC content for voltage associated with the DC content compensation circuit, wherein the DC content compensation circuit includes a feedback portion including a first diode and a second diode in a back to back configuration, a first resistor in parallel with a capacitor, in series with a second resistor, wherein the first switch and the second switch are connected to the fast voltage loop, wherein the first switch is configured to toggle a gain of the circuit between a gain associated with a normal mode and a gain associated with a power transfer mode based on a power transfer command signal, and wherein the second switch is configured to toggle control between the current control loop in the power transfer mode and the fast and slow voltage loops in the normal mode.

* * * * *